UNITED STATES PATENT OFFICE.

JONATHAN HALEY, OF PITTSBURG, PENNSYLVANIA.

GLASS MOLD FOR CASTING ORNAMENTAL PICTURE-FRAMES, &c.

SPECIFICATION forming part of Letters Patent No. 260,193, dated June 27, 1882.

Application filed April 25, 1882. (No model.)

*To all whom it may concern:*

Be it known that I, JONATHAN HALEY, of Pittsburg, in the county of Allegheny and State of Pennsylvania, have invented a new and useful Improvement in Glass Molds for Casting Ornamental Picture-Frames and other Ornamental and Decorative Articles, of which the following is a full, clear, and exact description.

The object of my invention is to secure a mold for ornamental or decorative purposes; and it consists in making molds of glass, as hereinafter described.

To enable others skilled in the art to make and use my invention, I will proceed to describe the exact manner in which I have carried it out.

In molds for decorative purposes—for instance, for ornamental crockery and decoration of picture-frames and medallions and bas-relief figures or moldings—the lines have to be very sharp and the surface of the mold exceedingly smooth in order to succeed. In the plastic surface now used by picture-frame makers and other workers in ornamental designs, the molds appear to have heretofore been made of wood or plaster, which failed to give either a smooth surface or sharp lines. The object of my invention is to overcome this difficulty.

By making these molds of glass the figures or objects can be brought out clear and perfect. Besides these advantages arising from my invention, another important one is that the molds will not wear out by use, and they can be made cheaper where a number of the molds are required for the same design.

The finest and most delicate figures can be cast from my improved molds. I first make a mold of the ornamental article I wish in either brass or iron, and then cast or press from such mold as many molds of glass as may be required in the same manner as articles in glassware are pressed in this way.

I form my molds for any ornaments or figures desired. I do not, of course, confine myself to any particular style, shape, or size of molds, as this can be indefinitely varied.

Having thus described my invention, what I claim as new, and desire to secure by Letters Patent, is—

Molds of glass for casting ornamental decorations for picture-frames, and for other ornamental and decorative purposes, substantially as and for the purpose set forth.

JONATHAN HALEY.

Witnesses:
W. RORAH,
HERMAN HEINREICH.